US007376224B2

(12) United States Patent
Wong

(10) Patent No.: US 7,376,224 B2
(45) Date of Patent: May 20, 2008

(54) PAY-PER-USE COMMUNICATION NODE CAPABILITIES

(75) Inventor: Kin Yee Wong, Nepean (CA)

(73) Assignee: Alcatel Lucent, Paris (FR)

( * ) Notice: Subject to any disclaimer, the term of this patent is extended or adjusted under 35 U.S.C. 154(b) by 1029 days.

(21) Appl. No.: 10/770,429

(22) Filed: Feb. 4, 2004

(65) Prior Publication Data

US 2005/0169447 A1   Aug. 4, 2005

(51) Int. Cl.
*H04M 15/00* (2006.01)
(52) U.S. Cl. ............... 379/121.01; 379/122; 379/134; 379/242; 379/244; 370/398; 370/395.21; 709/223
(58) Field of Classification Search ........... 379/114.01, 379/115.01, 212.01, 122, 134–136, 201.01–4, 379/242–244; 370/398, 395.21, 395.41–42; 709/223–226
See application file for complete search history.

(56) References Cited

U.S. PATENT DOCUMENTS

| 5,459,724 | A | * | 10/1995 | Jeffrey et al. ............... 370/398 |
| 5,537,403 | A | * | 7/1996 | Cloonan et al. ............ 370/352 |
| 5,544,168 | A | * | 8/1996 | Jeffrey et al. ............... 370/391 |
| 5,703,879 | A | * | 12/1997 | Proctor et al. .............. 370/398 |
| 5,889,954 | A | * | 3/1999 | Gessel et al. ............... 709/223 |
| 6,011,838 | A | * | 1/2000 | Cox ...................... 379/112.06 |
| 6,421,434 | B1 | * | 7/2002 | Rosu ......................... 379/133 |
| 6,449,350 | B1 | * | 9/2002 | Cox ........................... 379/134 |
| 6,556,659 | B1 | * | 4/2003 | Bowman-Amuah ........ 379/9.04 |
| 6,584,186 | B1 | * | 6/2003 | Aravamudan et al. . 379/201.03 |
| 6,622,017 | B1 | | 9/2003 | Hoffman |
| 2002/0109879 | A1 | * | 8/2002 | Wing So .................... 359/118 |
| 2002/0190700 | A1 | * | 12/2002 | Tzotzkov ................... 323/266 |
| 2004/0030766 | A1 | * | 2/2004 | Witkowski ................. 709/223 |
| 2004/0085359 | A1 | * | 5/2004 | Steg et al. .................. 345/771 |
| 2004/0088262 | A1 | | 5/2004 | Boucher et al. |
| 2004/0163131 | A1 | | 8/2004 | Benco |
| 2004/0202510 | A1 | * | 10/2004 | Suazo ........................ 405/118 |
| 2004/0202520 | A1 | * | 10/2004 | Guenther ................... 410/103 |
| 2004/0203686 | A1 | | 10/2004 | Bahr |

FOREIGN PATENT DOCUMENTS

WO   WO 97/46932   12/1997

OTHER PUBLICATIONS

XP-002328056, Software Feature and Upgrade Licenses for the Cisco 7400 Series Internet Router, Cisco Systems, 2002.

* cited by examiner

*Primary Examiner*—Binh K. Tieu

(57) ABSTRACT

A system and method are provided for enabling additional capacity or features on telecommunication nodes without requiring replacement of hardware. Service providers purchase hardware which is fully capable of providing a full suite of features and providing a large bandwidth capacity. However, depending on the amount of payment by the service provider, not all of the features or the bandwidth capacity is enabled. If the service provider wishes to increase the number of features or the capacity of a node, the additional features or capacity are enabled using software after payment to the vendor. This allows service providers to enter the market at an initially relatively low expense. Additional features and capacity can be purchased and enabled using software as demand grows, without having to purchase replacement hardware.

38 Claims, 4 Drawing Sheets

PAY-PER-USE COMMUNICATION NODE CAPABILITIES

FIELD OF THE INVENTION

The invention relates to services and feature management in communications equipment, and more particularly to pay-per-use schemes for equipment capacity and features.

BACKGROUND OF THE INVENTION

Telecommunication service providers face growing demands from customers, both in regard to capacity and features offered. This is especially true for start up companies, who anticipate much growth in demand. One method of dealing with growth of demand is to anticipate the growth by purchasing vendor equipment having bandwidth capacity and features which are not yet needed or which the service provider will not yet offer. As demand increases, the telecommunication nodes will already have the extra features and excess capacity to accommodate the growth in demand.

When providing special event services (such as video-on-demand or special internet engagements) or variable bit rate service (such as for packet processed voice or video, or email services), the capacity required by a telecommunication node is not constant. Service providers address this issue by estimating usage demand using traffic engineering analysis. The goal is to maximize usage of available capacity in order to minimize operational costs for the services offered.

However, this requires that a service provider invest much money in equipment that will not be used to full capacity for a long time. This is expensive for the service provider. The expense may be so great that a business considering entering the telecommunications business may not do so due to the large initial capital expense, thereby depriving equipment vendors of potential business.

A service provider may avoid a large initial capital expense by purchasing vendor equipment having only as much bandwidth capacity and features as will initially be offered to customers. As demand grows, equipment can be replaced by purchasing new hardware having greater capacity and features. However this is also expensive, both in terms of purchasing equipment and in terms of configuring the new equipment. It may also be difficult to switch traffic to the new equipment in a hitless manner. Upgrading equipment to versions offering greater capacity or additional features also requires equipment vendors to manufacture and support a range of telecommunications equipment. Replacement of equipment, even if only of line cards, requires a technician to visit the telecommunication node. This often requires the equipment vendor to provide a technician to visit a service provider's site in order to replace the equipment.

A method of allowing service providers to upgrade capacity and features on telecommunication nodes without requiring replacement of hardware would allow equipment vendors to offer relatively inexpensive telecommunication equipment to service providers who did not need a full capacity or feature-supported system. It would also allow service providers to expand service relatively inexpensively.

SUMMARY OF THE INVENTION

In accordance with one aspect of the invention, a method is provided for enabling capabilities on a telecommunication node having a control complex. An enabled status of each capability is associated in memory of the control complex. The enabled status of each capability is enforced by limiting operator access to configuration only of those capabilities which are enabled. In response to instructions from an operator, a specified capability is enabled by adjusting the enabled status of the specified capability. A charge is calculated for enabling the specified capability.

A duration for which the specified capability is to be enabled may be specified, and the step of calculating a charge retrieves a charge stored in memory and associated with the specified capability and the specified duration. Expiry of the specified duration following enabling of the specified capability may be monitored, and upon expiry of the specified duration the specified capability is disabled.

In one embodiment, a first corresponding security key for each capability is stored in memory. A second corresponding security key for each capability is stored in memory of the control complex, the second security key being correlatable on a one-to-one basis with the first security key corresponding to the capability. The specified capability is enabled by transmitting the first security key corresponding to the specified capability to the control complex. At the control complex, it is determined whether a second security key stored in memory of the control complex is related to the first security key transmitted to the control complex. If such a second security key is found, the capability corresponding to the second security key is enabled by adjusting the enabled status of the capability Apparatus are also provided for carrying out the methods of the invention, in the form of a telecommunication node, a network management system, processors, and computer-readable medium.

The methods and apparatus of the present invention allow an equipment vendor to offer a single set of hardware to service providers at a range of prices depending on how much capacity or how many features each service provider wishes to offer its customers. As demand grows, the service provider can pay for upgrades to capacity or features without having to pay for and install entire new systems of hardware. The service provider can also pay for a temporary upgrade to capacity or features, for example in order to increase bandwidth during a web cast of a concert. The equipment vendor can enable the additional capacity or features remotely by modifying software on the telecommunications node, thereby allowing a hitless and relatively inexpensive upgrade. The invention allows a pay-per-use billing method to be used between a vendor and a service provider, the service provider paying only for the capacity and features that are needed.

BRIEF DESCRIPTION OF THE DRAWINGS

The features and advantages of the invention will become more apparent from the following detailed description of the preferred embodiment(s) with reference to the attached figures, wherein.

It will be noted that in the attached figures, like features bear similar labels.

DETAILED DESCRIPTION OF THE EMBODIMENTS

Figure 1:
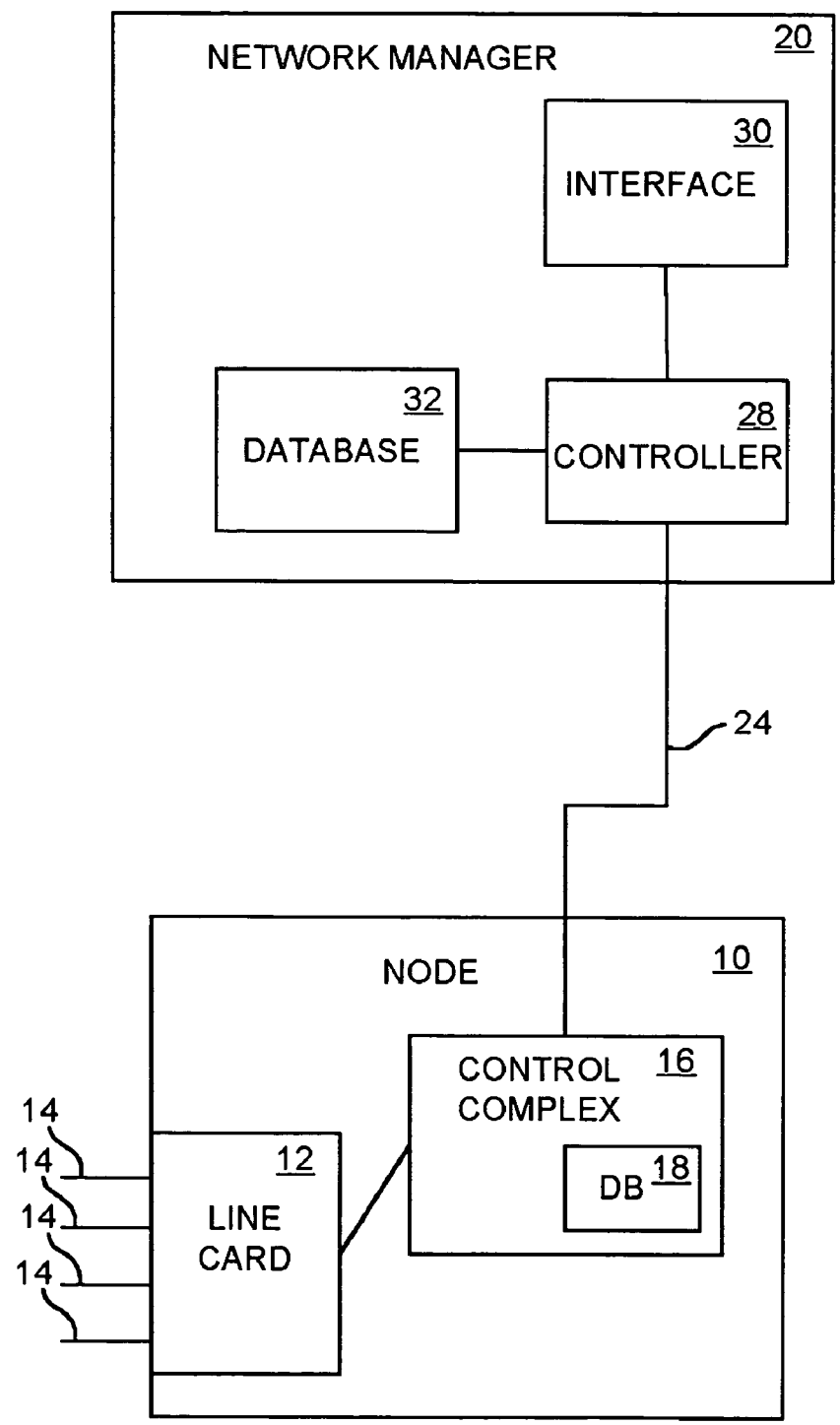
FIG. 1 is a block diagram of a telecommunications node and management system according to one embodiment of the invention.

Referring to FIG. 1, a block diagram of a telecommunication node and management system according to one embodiment of the invention is shown. A telecommunication node 10 includes a line card 12. The line card 12 provides communication access to other telecommunication nodes (not shown) within a network through at least one port 14. For example, the line card 12 could support four physical OC-12 ports, providing a maximum capacity equivalent to OC-48. The node 10 also includes a control complex 16, such as a control card, a number of control cards, or a combination of at least one control card and other hardware. The control complex 16 provides an interface to a network manager, for example through a command line interface, SNMP, TL1, or XML. The control complex 16 includes a node database 18 of security keys, line card resources, and allowed line card resources (explained in more detail below).

The control complex 16 communicates with an operator through a network 24, such as an Ethernet network. The control complex 16 also communicates with a network manager 20 through the network 24. The network manager 20 includes a controller 28, a user interface 30, and a network manager database 32. The controller 28 includes instructions for processing commands received from an operator through the user interface 30, for accessing the network manager database 32, and for communicating with the node 10. The network manager database 32 includes security keys, available credits, line card resources, and costs of line card resources (explained in more detail below). The controller 28 may communicate with additional telecommunication nodes through respective control cards on the nodes. Both the node 10 and the network manager 20 are under administrative control of the same service provider.

The instructions within the controller 28 and the control complex 16 are preferably in the form of software loaded into memory of one or more processors. Alternatively, the instructions are in the form of circuits, possibly within a processor (including a microprocessor) or distributed within a plurality of processors. Generally, the instructions may be in the form of any combination of software and hardware. The instructions may be stored on a computer-readable medium.

Figure 2:
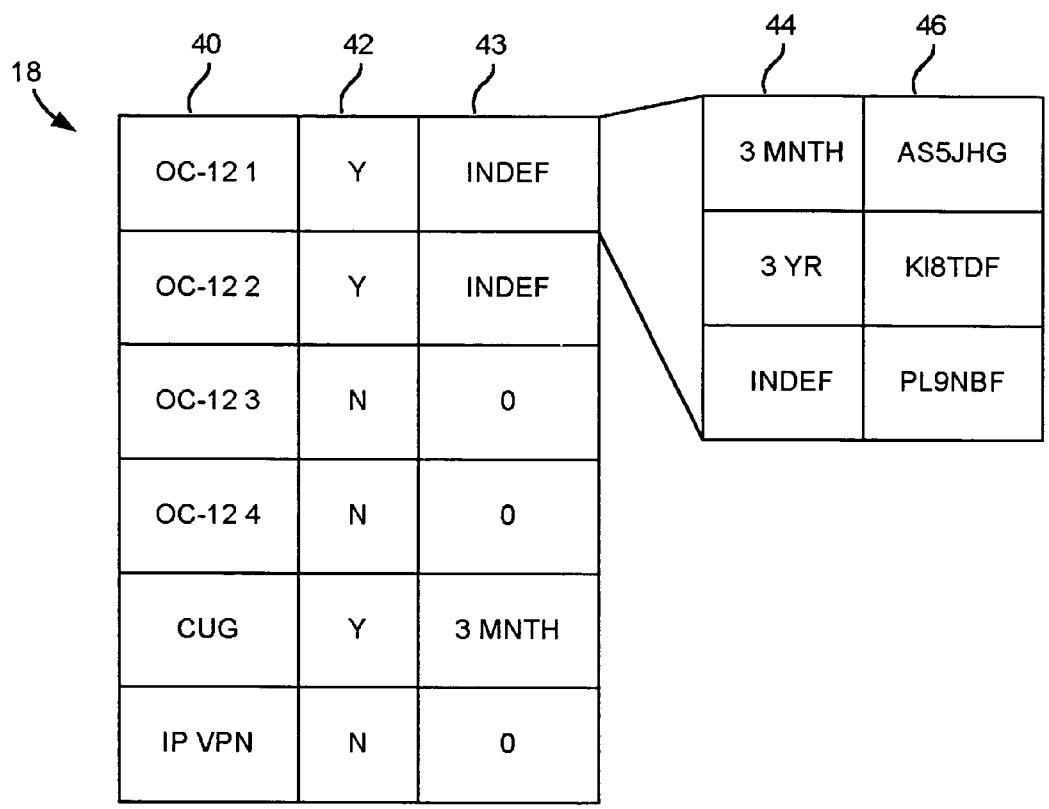
FIG. 2 is a diagram of the node database of FIG. 1 according to one embodiment of the invention, showing example values.

Referring to FIG. 2, a node database 18 according to one embodiment of the invention is shown. The particular values shown in the node database 18 of FIG. 2 are for example purposes only. The node database 18 includes a list of capabilities 40. For each capability 40, the node database 18 includes an associated enabled status 42, an associated duration 43, and at least one desired duration 44. For each desired duration 44, the node database 18 includes a security key 46. The capabilities may include individual ports, thereby representing bandwidth capacity, and features. In the example of FIG. 2, the list of capabilities 40 includes four OC-12 ports, support for Closed User Groups (CUGs), and support for Internet Protocol (IP) Virtual Private Networks (VPNs). The associated enabled statuses 42 indicate that only two of the OC-12 ports are enabled (thereby limiting capacity to half the maximum capacity), that CUGs are supported, and that IP VPNs are not supported. The durations 43 and the desired durations 44 may be in any units, and a reserved value may be used to represent indefinite duration. The durations 43 indicate the current duration of enablement and may be represented by an expiry time or date. The desired durations 44 represent possible durations, and do not relate to the current duration of enablement of the capability. The security keys 46 shown in FIG. 2 are for example purposes only, and the particular alphanumeric sequences shown are meaningless.

The capacity of the node 10 can be represented in any of a number of ways using traffic parameters relating to bandwidth, such as Sustained Information Rate, Maximum Information Rate, Maximum Burst Size, or Minimum Information Rate. Other constraints on connections can be represented in the node database 18, such as number of Layer 2 connections, number of Layer 3 interfaces, or number of PPP sessions. Features of the node 10 may include ATM Switched Services such as VBN, HCM, or PBR, as examples only.

Figure 3:
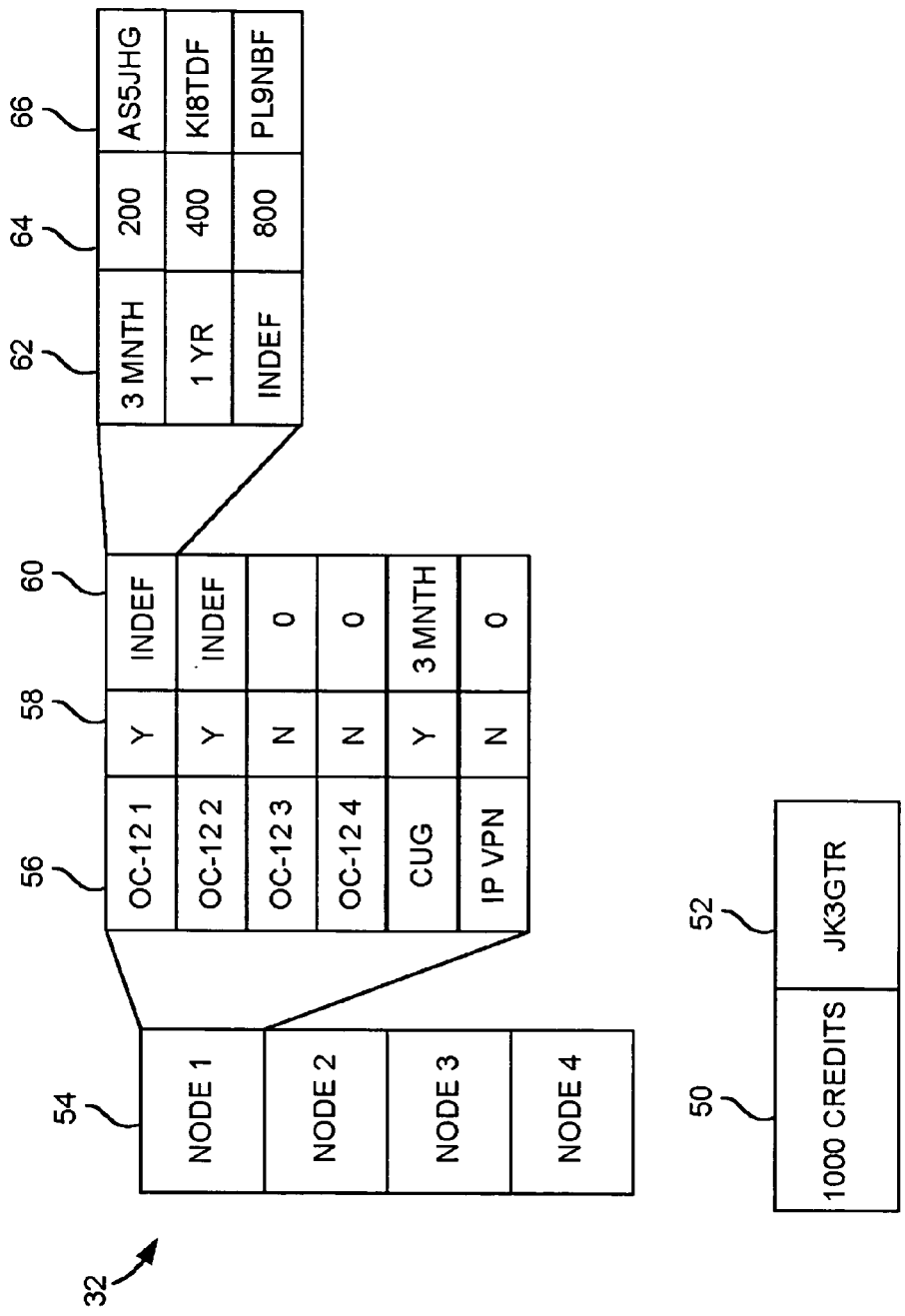
FIG. 3 is a diagram of the network manager database of FIG. 1 according to one embodiment of the invention, showing example values.

Referring to FIG. 3, the network manager database 32 according to one embodiment of the invention is shown, including an example list of capabilities and associated costs and security keys. The particular values shown in FIG. 3 are for example purposes only. The network manager database 32 includes a number of available credits 50 and a credits security key 52, and a list of nodes 54. For each node in the list of nodes 54, the network manager database 32 includes a list of at least one capability 56 on each node (as described above with reference to the node database 18). For each capability, the network manager database 32 includes an associated enabled status 58, an associated enablement duration 60, and at least one desired duration 62. For each desired duration 62, the network manager database 32 includes an associated cost 64 and an associated security key 66. The number of available credits 50 can be represented using any set of units, and need not be expressed in monetary amounts.

An example list of capabilities 56 and associated data 58 to 66 is shown in FIG. 3, corresponding with the list of capabilities described above with reference to the example node database of FIG. 2. The associated enabled statuses 58 match the enabled statuses 42 for the node to which the list of capabilities corresponds. The associated enablement durations 60 and the desired durations 62 may be in any units, and a reserved value may be used to indicate that the associated capability is to remain enabled indefinitely. The associated costs 64 are in units which can be correlated to the units of the number of available credits 50. The associated security keys 66 are associated with the security keys 46 stored in the node database 18, though they will generally not be identical, as described in more detail below. The associated security keys 66 and the credits security key 52 shown in FIG. 3 are for example purposes only, and the particular alphanumeric sequences shown are meaningless.

In day-to-day operation, the control complex 16 only permits certain capabilities of the line card to be activated by a network manager. When an operator accesses the control complex 16, the control complex 16 consults the node database 18 to determine which capabilities are permitted, that is, paid for. For example, if the service provider has only paid for half capacity on the line card, then the control complex 16 learns from the node database 18 that options for configuring only two of the four OC-12 ports (as an example) are to be presented to an operator. The control complex 16 disables management interfaces for the capabilities which have not been enabled, and presents options for configuring only those capabilities which have been enabled, that is, for which the service provider has paid.

The control complex 16 periodically checks the durations 43 of each capability 40 that is enabled. If the duration of a capability has expired, the control complex 16 disables the capability by changing the enabled status 42 of the capability. The control complex 16 also sends a message to the controller 28 indicating that the capability has been disabled. The controller 28 updates the network manager database 32 to reflect the new enabled status 58 for the capability 56 and the node 54. This allows capacity or features to be enabled for a finite duration, thereby allowing the service provider to purchase capacity or features for limited durations on a pay-per-use basis.

The node 10 is initially configured to provide baseline capabilities, such as ATM, IP, and MPLS (as examples only). If an operator wishes to increase the capabilities of the node 10, the operator accesses the controller 28 through the user interface 30, and selects a node 54 from the network manager database 32. The operator is presented with the respective list of capabilities 56, the enabled statuses 58, and the durations 60. The operator selects a capability which is to be enabled, and is presented with the associated desired durations 62 and the associated costs 64, but not the associated security keys 66. The operator is also presented with the available credits 50. The operator then selects a desired duration 62 for which the capability is to be enabled. The operator may wish to enable the capability indefinitely, or may wish to enable the capability for a fixed period of time. For example, the operator may wish to increase bandwidth capacity for only three hours in order to present a web cast of a concert.

Once the operator has selected a node, a capability, and a desired duration, the controller 28 retrieves the associated security key 66 and passes it to the control complex 16. The control complex 16 looks for a related security key in the node database 18. If it finds a related security key, it determines from the node database 18 the associated capability and the desired duration 44. The control card then enables the capability by setting the enabled status 42 and the duration 43. From then on, when an operator accesses the control complex 16 the operator will be able to configure the newly enabled capability. The control complex 16 returns a confirmation message to the controller 28 in the network manager 20, and the controller then updates the enabled status 58 and the duration 60 associated with the capability 56, and adjusts the available credits 50 by the cost 64 associated with the capability 56 and desired duration 62.

Each security key stored in each of the network manager database 32 and the node database 18 is particular to the node, customer, capability, and duration. The corresponding security keys stored in each of the network manager database 32 and the node database 18 need not be identical. The control complex 16 need only be able to verify that a security key 66 provided by the controller 28 and a respective security key 46 stored in the node database 18 are uniquely related on a one-to-one basis. For added security, the security keys need not be actually stored, but may be generated as needed using identical algorithms running on the network manager 20 and the control complex 16.

An operator may purchase additional credits from the vendor. If the vendor receives a purchase order for additional credits, the vendor accesses the controller 28 on the network manager 20, and transmits a security key that the controller can match with the credits security key 52, thereby gaining access to the available credits amount 50 and increasing it. Alternatively, a number of credits security keys can be stored in the network manager database 32, each corresponding to a different increase in available credits. The vendor can then send a simple command along with the appropriate security key or keys, and the controller 28 determines by how much to increase the available credits by matching the provided security keys with the security keys associated with the different increases. As for the situation of enabling features, the security key provided by the vendor need not be identical to the security key stored in the network manager database 32. The controller 28 need only be able to ensure a one-to-one correlation between the provided security key and the stored security key.

In one embodiment, comparison of the provided security key and the stored security key is carried out by a set of instructions separate from the set of instructions for enabling line card capabilities. This allows flexibility in the choice of security key system.

The invention has been described in which the service provider can enable capabilities on a node, either for a fixed duration or indefinitely, as long as sufficient credits are available. Alternatively, the controller 28 and the network manager database 32 can be located under administrative control of the vendor, and the controller need not communicate directly with the control complex 16. In such an embodiment, a service provider who wishes to enable a new capability on the control card contacts the vendor. Once payment terms are arranged, the vendor consults the network manager database to retrieve the appropriate security key and transmits the security key to the control card, which in turn enables the capability. However, this requires the vendor to access each node in turn, either individually or by logging on to the service provider's network 24.

Figure 4:
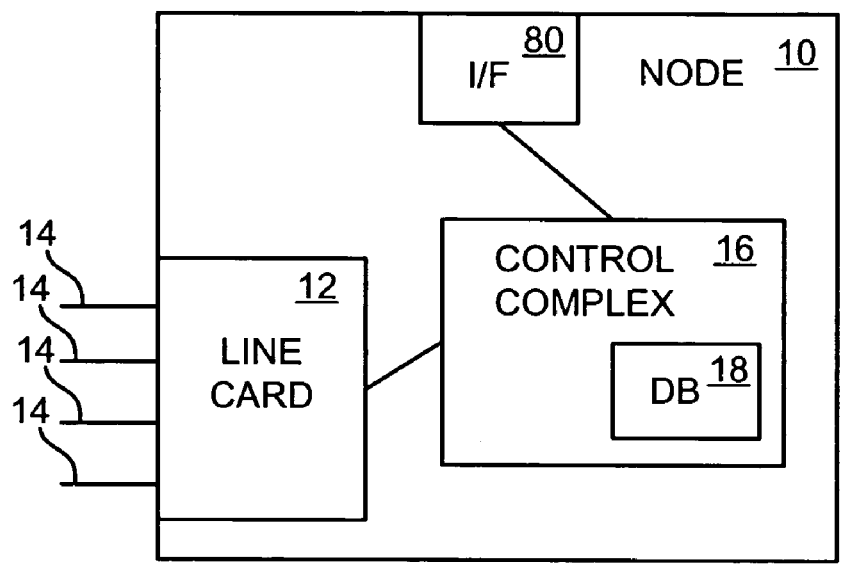
FIG. 4 is a diagram of a telecommunications node according to another embodiment of the invention.

The invention has been described using a network manager as a centralized access means to the telecommunication nodes within the network. Referring to FIG. 4, a telecommunication node according to another embodiment of the invention is shown. In this embodiment, the operator accesses the telecommunication nodes directly through an interface 80. The telecommunication node is otherwise the same as the telecommunication node described above with reference to FIG. 1. The security keys provided to the control complex 16 in order to enable features or capacity are provided directly through the interface 80. The security keys are stored at the vendor site. When the service provider wishes to increase capacity or add a feature, either indefinitely or for a specified duration, the service provider contacts the vendor. The vendor and the service provider arrange for payment of the additional capability or capabilities. The vendor then either accesses the control complex 16 through the interface 80 and manually provides the security key associated with the specified capability and duration, or provides the security key to the service provider who then accesses the control complex 16 through the interface 80 and manually provides the security key.

In either case, the control complex 16 updates the node database thereby enabling the specified capability. However, while this embodiment of the invention does not require a network manager 20, the use of a network manager simplifies administration of the capabilities of all nodes in the network. Use of a network manager also allows storage of credits, which allows the service provider to change capabilities of the node with less interaction with the vendor.

The invention has been described using a stored representation of available credits in order to streamline implementation of additional capabilities on telecommunication nodes. Alternatively, the network manager database 32 does not include a stored available credits and a charge security key. The network manager database 32 also does not include the associated security keys 66. The service provider accesses the network manager database to select a node, a capability, and a duration, and views the charge associated with the capability and the duration. The service provider then contacts the vendor and arranges for payment for the capability. The vendor retrieves the appropriate associated security key and sends it to the service provider. The service provider then provides the associated security key to the network manager, which in turn sends the associated security key to the node. The control complex and the controller then operate as described above with respect to the preferred embodiment, enabling the capability and updating their respective databases.

The invention has been described in which both bandwidth capacity and features can be enabled using software and security keys. Alternatively, either one of bandwidth capacity or a set of features can be enabled using the method of the invention.

The embodiments presented are exemplary only and persons skilled in the art would appreciate that variations to the embodiments described above may be made without departing from the spirit of the invention. The scope of the invention is solely defined by the appended claims.

I claim:

1. A method of enabling capabilities on a telecommunication node having a control complex, the method comprising the steps of:
    associating in memory of the control complex an enabled status of each capability;
    enforcing the enabled status of each capability by limiting operator access to configuration only of those capabilities which are enabled;
    in response to instructions from an operator, enabling a specified capability by adjusting the enabled status of the specified capability; and
    calculating a charge for enabling the specified capability.

2. The method of claim 1 wherein the step of calculating a charge comprises retrieving a charge stored in memory and associated with the specified capability.

3. The method of claim 1 comprising the further step of specifying a duration for which the specified capability is to be enabled, and wherein the step of calculating a charge comprises calculating a charge associated with the specified capability and the specified duration.

4. The method of claim 3 comprising the further step of monitoring for expiry of the specified duration following enabling of the specified capability, and upon expiry of the specified duration disabling the specified capability.

5. The method of claim 3 wherein the step of calculating a charge comprises retrieving a charge stored in memory and associated with the specified capability and the specified duration.

6. The method of claim 1 further comprising the steps of:
    for each capability, storing a first corresponding security key in memory; and
    for each capability, storing a second corresponding security key in memory of the control complex, the second security key being correlatable on a one-to-one basis with the first security key corresponding to the capability;
    and wherein the step of enabling a specified capability comprises:
    transmitting the first security key corresponding to the specified capability to the control complex;
    at the control complex, determining whether a second security key stored in memory of the control complex is related to the first security key transmitted to the control complex; and
    if such a second security key is found, enabling the capability corresponding to the second security key by adjusting the enabled status of the capability.

7. The method of claim 6 wherein the step of storing a first corresponding security key comprises storing the first corresponding security key in memory of a network manager separate from the telecommunication node.

8. The method of claim 1 wherein the capabilities include bandwidth.

9. The method of claim 8 wherein the step of enabling a specified capability comprises enabling at least one port at the node in order to increase bandwidth.

10. The method of claim 1 wherein the capabilities include node features.

11. The method of claim 10 wherein the capabilities include at least one of VBN, CUGs, HCM, PBR, and IP VPNs.

12. The method of claim 1 further comprising the step of associating a set of respective durations for each capability, and wherein the step of enabling a specified capability comprises enabling the specified capability for a specified duration, the specified duration being one of the durations associated with the capability.

13. The method of claim 12 wherein the step of calculating a charge comprises calculating a charge associated with the specified capability and with the specified duration.

14. The method of claim 13 wherein the step of calculating a charge comprises retrieving a charge stored in memory and associated with the specified capability and with the specified duration.

15. The method of claim 13 comprising the further steps of:
    for each combination of capability and associated duration, storing a first corresponding security key in memory; and
    for each combination of capability and associated duration, storing a second corresponding security key in memory of the control complex, the second security key being correlatable on a one-to-one basis with the first security key corresponding to the combination of capability and associated duration;
    and wherein the step of enabling a specified capability comprises:
    transmitting the first security key corresponding to the specified capability and the specified duration to the control complex;
    at the control complex, determining whether a second security key stored in memory of the control complex is related to the first security key transmitted to the control complex; and
    if such a second security key is found, enabling the capability corresponding to the second security key by adjusting the enabled status of the capability for the duration corresponding to the second security key.

16. The method of claim 15 wherein storing a first corresponding security key comprises storing the first corresponding security key in memory of a network manager separate from the telecommunication node.

17. The method of claim 16 wherein the step of calculating a charge comprises retrieving a charge stored in memory and associated with the specified capability and the specified duration.

18. The method of claim 16 wherein the telecommunication node is under administrative control of a service provider, wherein each first security key is stored in memory inaccessible to the service provider, and the method comprising the further step of:

retrieving the first security key corresponding to the specified capability from memory; and transmitting the first security key corresponding to the specified capability to the service provider.

19. The method of claim 18 wherein each first security key is stored in memory under administrative control of a vendor, and the method comprising the further step of:

arranging payment of the charge from the service provider to the vendor before transmitting the first security key to the service provider.

20. The method of claim 1 comprising the further steps of:
storing a representation of available credits;
deducting the charge from the available credits.

21. The method of claim 20 wherein the representation of available credits is encrypted, and wherein the method comprises the further steps of:

storing at least one first credits security key in memory, each first credits security key corresponding to a respective credit augmentation amount;

providing a second credits security key;

determining whether one of the at least one first credits security key is related to the second credits security key on a one-to-one basis; and if such a first credits security key is found, augmenting the stored available credits by the credit augmentation amount corresponding to the first credits security key.

22. The method of claim 21 wherein storing a representation of available credits comprises storing the representation of available credits in memory of a network manager separate from the telecommunication node, and wherein storing at least one first credits security key comprises storing at least one first credits security key in memory of the network manager.

23. A computer-readable medium comprising:

instructions for presenting at least one configuration option to a user interface, each configuration operation corresponding to one of a set of at least one enabled capability of a telecommunication node;

instructions for receiving a first security key;

instructions for identifying a particular capability which corresponds to the first security key;

instructions for adding the particular capability to the set of at least one enabled capability; and instructions for calculating a charge corresponding to the particular capability.

24. The computer-readable medium of claim 23 wherein the instructions for calculating a charge comprise instructions for retrieving a charge stored in memory and associated with the particular capability.

25. The computer-readable medium of claim 23 further comprising instructions for identifying a duration which corresponds to the first security key, and wherein the instructions for calculating a charge comprise calculating a charge associated with the particular capability and with the duration.

26. The computer-readable medium of claim 25 further comprising instructions for monitoring for expiry of the duration, and upon expiry of the duration removing the particular capability from the set of at least one enabled capability.

27. The computer-readable medium of claim 23 further comprising:

instructions for accessing a set of at least one second security key, each second security key corresponding to one of a set of at least one capability;

and wherein the instructions for identifying the particular capability comprise:

instructions for determining a particular second security key which corresponds to the first security key; and instructions for identifying the particular capability associated with the particular second security key.

28. The computer-readable medium of claim 25 further comprising:

instructions for accessing a set of at least one second security key, each second security key corresponding to one of a set of at least one combination of capability and duration; and instructions for determining a particular second security key which corresponds to the first security key;

and wherein the instructions for identifying the particular capability comprise instructions for identifying the particular capability associated with the particular second security key, and wherein the instructions for identifying a duration comprise instructions for identifying the duration associated with the particular second key.

29. A processor for use within a telecommunication node, comprising:

instructions for presenting at least one configuration option to a user interface, each configuration operation corresponding to one of a set of at least one enabled capability of the telecommunication node;

instructions for receiving a first security key;

instructions for identifying a particular capability which corresponds to the first security key;

instructions for adding the particular capability to the set of at least one enabled capability; and instructions for calculating a charge corresponding to the particular capability.

30. The processor of claim 29 wherein the instructions for calculating a charge comprise instructions for retrieving a charge stored in memory and associated with the particular capability.

31. The processor of claim 29 further comprising instructions for identifying a duration which corresponds to the first security key, and wherein the instructions for calculating a charge comprise calculating a charge associated with the particular capability and with the duration.

32. The processor of claim 31 further comprising instructions for monitoring for expiry of the duration, and upon expiry of the duration removing the particular capability from the set of at least one enabled capability.

33. The processor of claim 29 further comprising:

instructions for accessing a set of at least one second security key, each second security key corresponding to one of a set of at least one capability;

and wherein the instructions for identifying the particular capability comprise:

instructions for determining a particular second security key which corresponds to the first security key; and instructions for identifying the particular capability associated with the particular second security key.

34. The processor of claim 31 further comprising:

instructions for accessing a set of at least one second security key, each second security key corresponding to one of a set of at least one combination of capability and duration; and instructions for determining a particular second security key which corresponds to the first security key;

and wherein the instructions for identifying the particular capability comprise instructions for identifying the particular capability associated with the particular second security key, and wherein the instructions for identifying a duration comprise instructions for identifying the duration associated with the particular second key.

35. A computer-readable medium comprising:
instructions for presenting at least one selection to a user interface, each selection comprising a capability of a telecommunication node and a duration;
instructions for receiving an identification of a particular selection from the user interface;
instructions for determining a first security key associated uniquely with the particular selection; and
instructions for transmitting the first security key to the telecommunication node.

36. The computer-readable medium of claim 35 further comprising:
instructions for accessing a representation of available credits;
instructions for determining a charge associated with the particular selection; and
instructions for adjusting the representation of available credits by deducting the charge from the representation of available credits.

37. A processor for use within a network management station, comprising:
instructions for presenting at least one selection to a user interface, each selection comprising a capability of a telecommunication node and a duration;
instructions for receiving an identification of a particular selection from the user interface;
instructions for determining a first security key associated uniquely with the particular selection; and
instructions for transmitting the first security key to the telecommunication node.

38. The processor of claim 37 further comprising:
instructions for accessing a representation of available credits;
instructions for determining a charge associated with the particular selection; and
instructions for adjusting the representation of available credits by deducting the charge from the representation of available credits.

* * * * *